United States Patent [19]

Huang

[11] Patent Number: 4,970,899
[45] Date of Patent: Nov. 20, 1990

[54] PRESSURE GAUGE

[76] Inventor: Tien-Tsai Huang, No. 4, Lane 30, Wu-Chang St., Pan-Chiao City, Taiwan

[21] Appl. No.: 470,155

[22] Filed: Jan. 25, 1990

[51] Int. Cl.$^5$ .............................................. G01L 7/16
[52] U.S. Cl. .................................................. 73/744
[58] Field of Search ............... 73/744, 745, 746, 146.8

[56] References Cited

U.S. PATENT DOCUMENTS

| 4,742,714 | 5/1988 | Huang | 73/744 |
| 4,785,670 | 11/1988 | Huang | 73/744 |
| 4,885,940 | 12/1989 | Huang | 73/744 |

Primary Examiner—Donald O. Woodiel

[57] ABSTRACT

A pressure gauge of the type having a dial with a pointer includes a tubular pressure chamber body receiving a piston with a piston rod whose one end extending out of the pressure chamber body is provided with an adjustment screw thread. An L-shaped rod member extends between the pressure chamber body and a graduated plate of the dial and has a toothed end engaging with a transmitting gear which is connected to the pointer. The angled portion of the L-shaped rod member is provided with an adjustment screw hole to receive and engage with the outer threaded end of the piston rod. The pressure gauge has a reduced size and facilitates the adjustment of the pointer in case of fatigue of the urging spring.

5 Claims, 5 Drawing Sheets

PRESSURE GAUGE

BACKGROUND OF THE PRESENT INVENTION

1. Field of the Invention

This invention relates to a pressure gauge which has a dial with a pointer to show the results of measurement of the pressure gauge.

2. Description of Background Art

Pressure gauges or the type described above are commonly used in measurements of pressure in pipelines, pressure containers, etc. Many improvements have been made by the applicant of this invention. FIGS. 1A and 1B show one of the improved pressure gauges which is provided by the applicant. The pressure gauge is characterized in that: (1) The conventional straight piston rod is changed to a U-shaped rod A to reduce the size of the pressure gauge, the U-shaped rod having rack teeth a1 at one end and a screw thread a2 at the other end to be connected threadedly with a piston B; (2) the conventional pressure chamber body is substituted by a body C which is connected with a channel-like guide piece D; and (3) the conventional positioning body and plate to hold a transmitting gear of the pointer is substituted by an L-shaped plate E. This pressure gauge has a reduced size and reduces the risk of malfunctioning as well as the risk of causing errors in measurement.

FIG. 2 shows a second pressure gauge of the applicant which is improved to eliminate the defect found in the pressure gauge of FIG. 1 such as that the chuck G and the sealing member H provided in the tubular pressure chamber body C must be removed in case the pressure gauge is adjusted. In the second pressure gauge, the bottom T of the tubular pressure chamber body C is hollowed and provided with an internal screw thread t1, receiving an adjustment screw cap S with a diametrical bottom groove s1, so that adjustment can be made by turning the screw cap S. However adjustment of the pressure gauge must be accomplished by removing the housing from the pressure gauge.

FIG. 3 shows a third pressure gauge whose air intake port is provided at an end face Q of the housing and whose pressure chamber body C is provided with an inner tubular member P to receive a piston. An air passage R is provided between the walls of the inner tubular member P and the outer hollow body C to permit air to enter the inner tubular member P from the air intake port.

SUMMARY OF THE INVENTION

An object of the invention is to provide a pressure gauge, of the type having a dial with a pointer, which has a reduced size and whose pointer can be adjusted easily in case of fatigue of an urging spring.

According to the present invention, a pressure gauge comprises: a housing having a peripheral wall with a first end and an opposite second end; a graduated plate provided transversely in the peripheral wall at the first end; a rotary pointer provided adjacent the graduated plate; a tubular body provided transversely in the housing between the graduated plate and the second end and having a third end and an opposite fourth end; a chuck with an air intake port attached to the third end and extending outwardly through the peripheral wall; a first piston provided in said tubular body in sliding and sealing contact with said peripheral wall; a spring provided between the first piston and the second end and urging the first piston towards the first end; a piston rod connected to the first piston and extending outwardly of the tubular body through the fourth end, the piston rod having a threaded adjustment outer end; an L-shaped rod member extending between the tubular body and the graduated plate, the L-shaped rod member having a toothed end adjacent to the graduated plate and an angled portion which has a threaded adjustment hole engaging with the threaded adjustment outer end of the piston rod; and a transmitting gear engaging with the tooth end and connected to the pointer. The peripheral wall of the housing is provided with an access hole adjacent to the threaded adjustment outer end of the piston rod and a plug member to close the access hole.

In one aspect of the invention, the second end of the tubular body is a threaded open end and has an adjustment screw member inserted in the threaded open end of the tubular body.

In another aspect of the invention, the pressure gauge further comprises a second piston member which is provided adjacent the first piston and which is a thick molded plastic member having a peripheral wall in sliding and sealing contact with the peripheral wall of the tubular body and a recessed face facing the chuck member.

In still another aspect of the invention, the pressure gauge further comprises a mounting plate abutting the graduated plate and spaced from the tubular body, and a connecting plate connected to both the mounting plate and the tubular body, the transmitting gear having a shaft which is mounted to the peripheral wall of the tubular body and the mounting plate.

The present exemplary preferred embodiment will be described in detail with reference to the accompanying drawings, in which

DETAILED DESCRIPTION OF THE PREFERRED EMBODIMENT

Figure 1B:
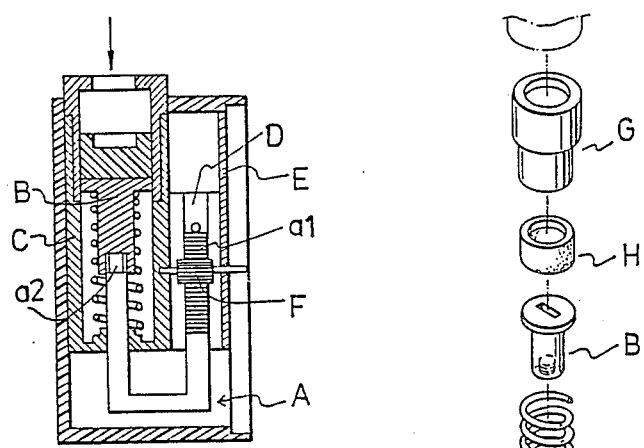
FIGS. 1A, 1B, 2 and 3 show a pressure gauge of the prior art.
Figure 1A:
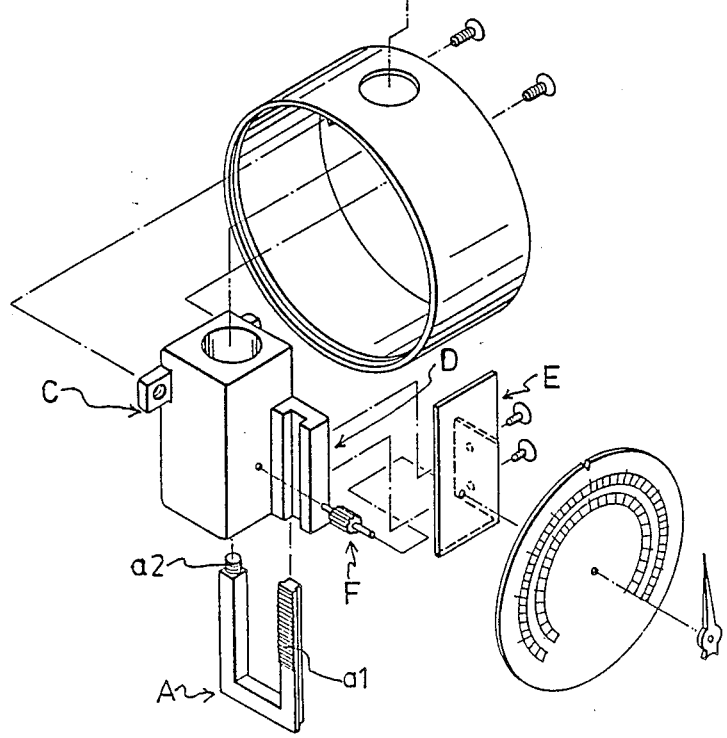
Figure 2:
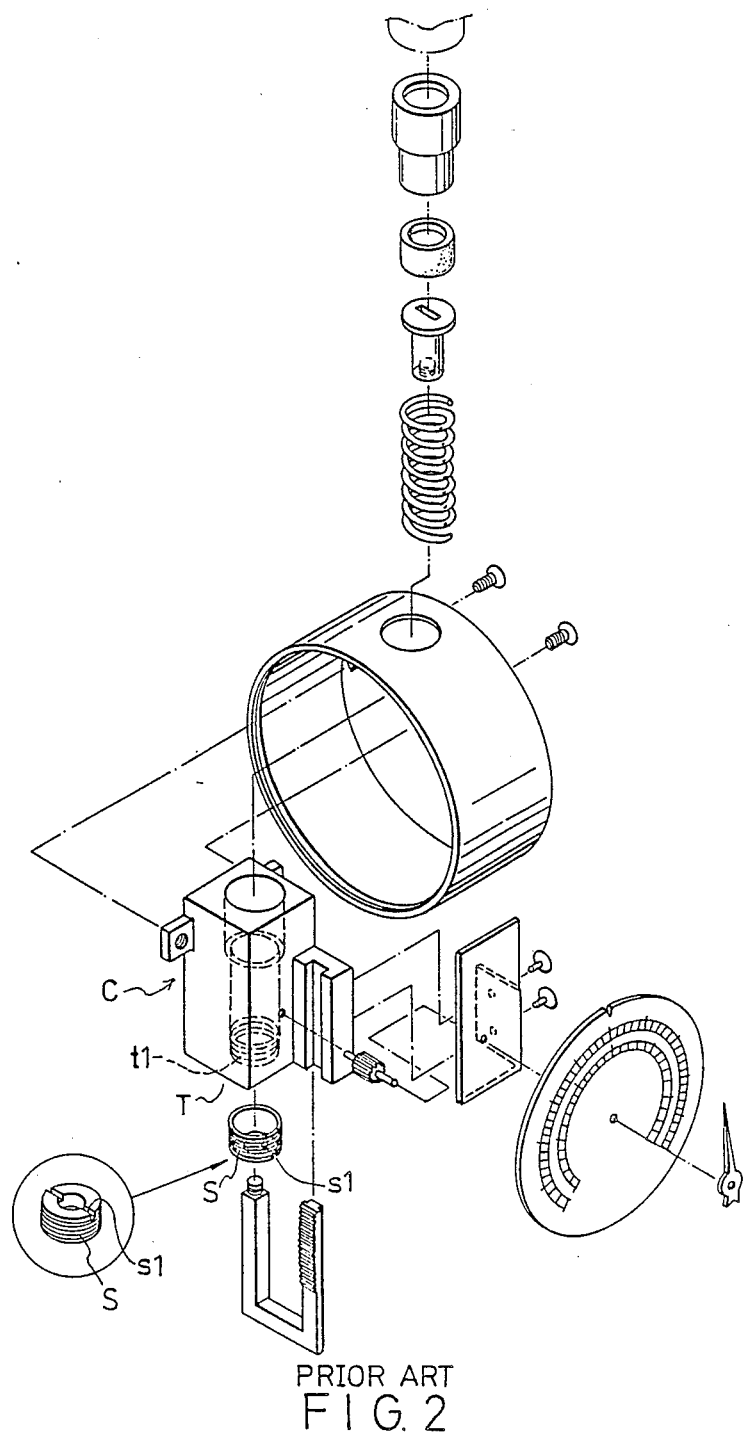
Figure 3:
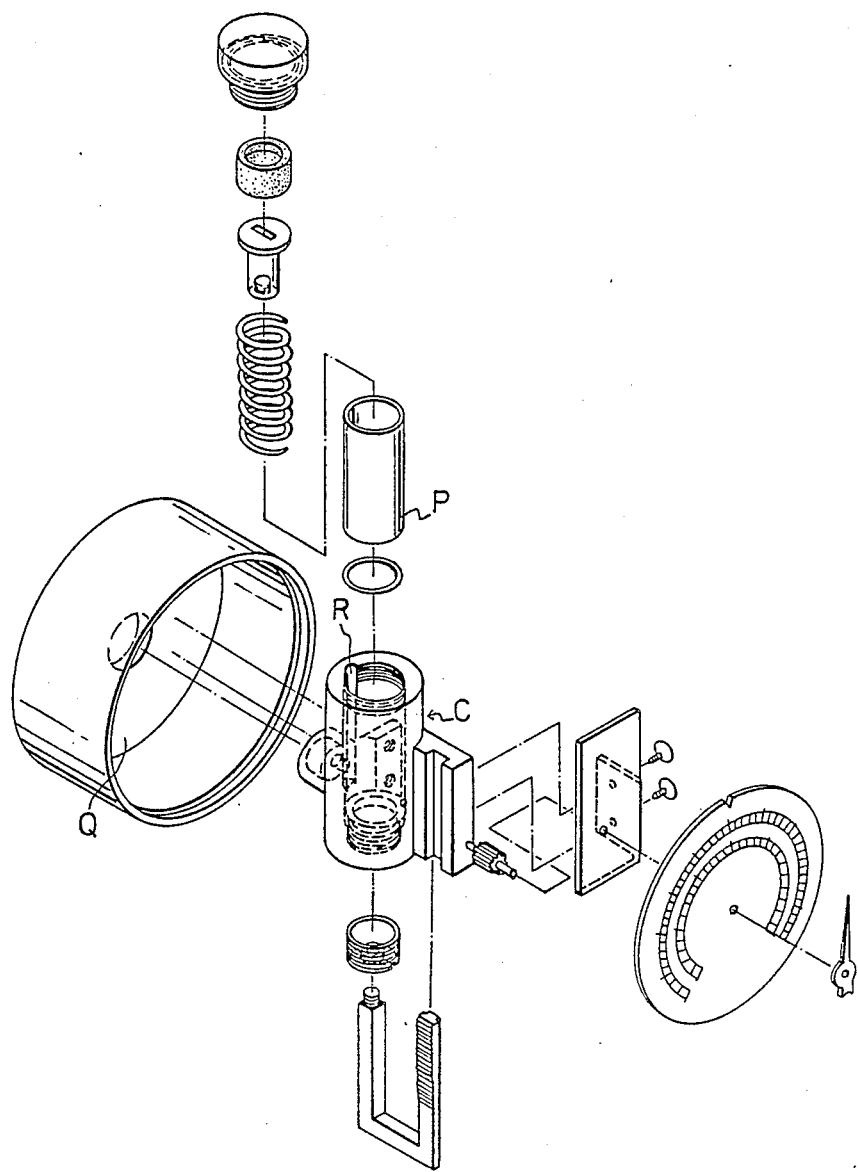
Figure 4:
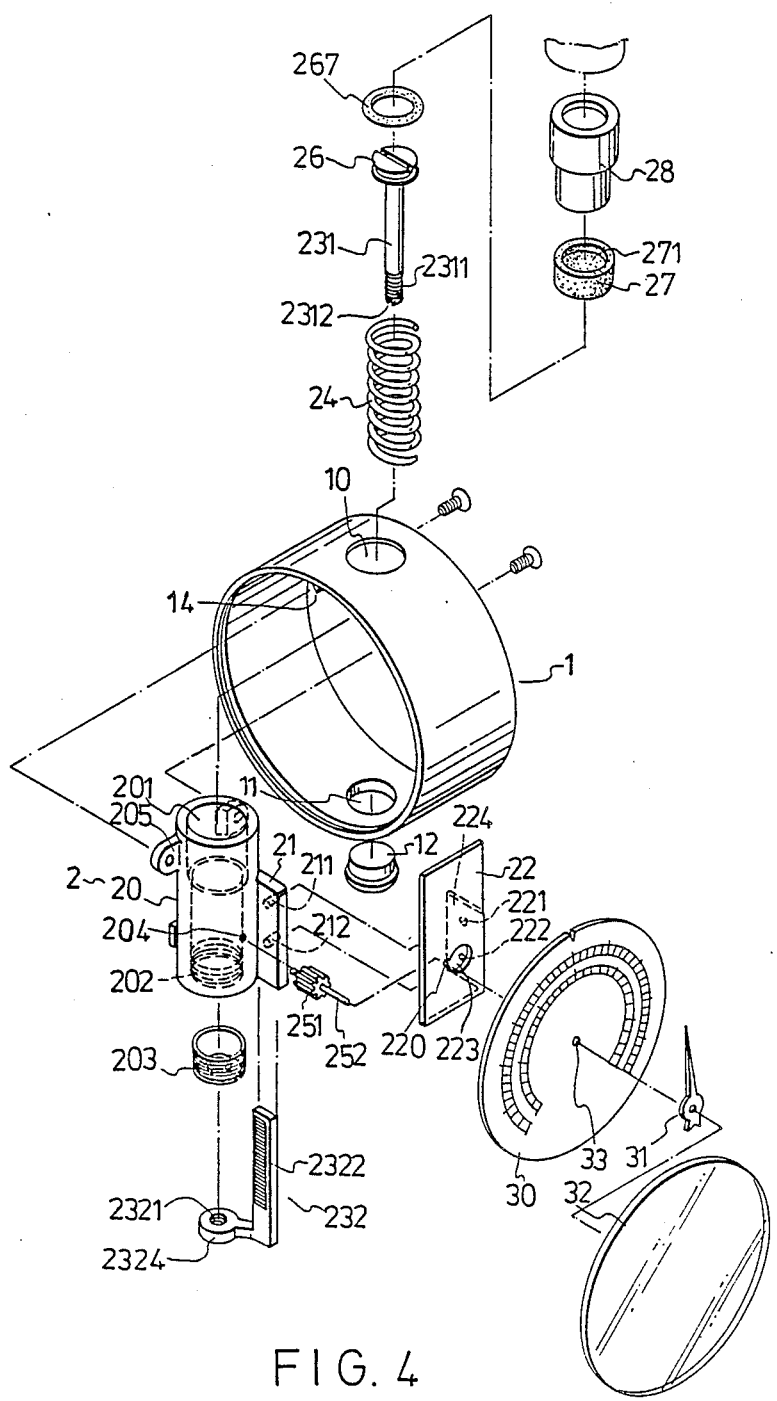
FIG. 4 is an exploded view of a pressure gauge embodying the present invention.
Figure 6:
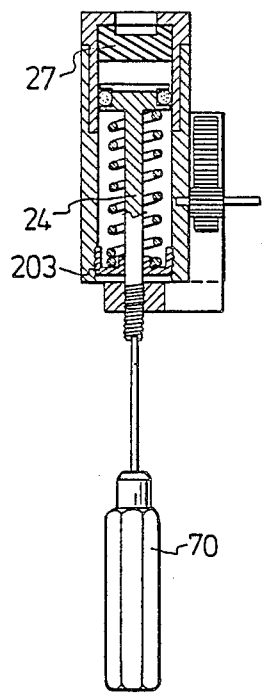
FIG. 6 shows the adjustment of the pressure gauge when the housing is removed.
Figure 5:
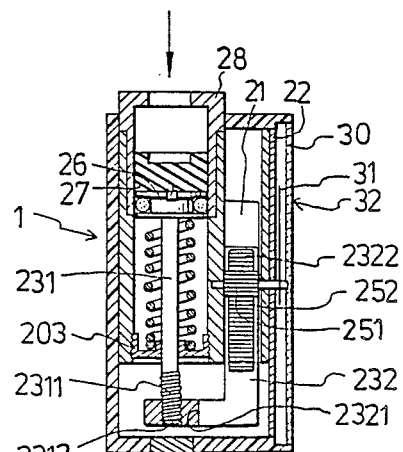
FIG. 5 is a sectional view of the pressure gauge of FIG. 4.

Referring to FIGS. 4 to 6, a pressure gauge embodying the present invention is shown, including a cylindrical housing 1 having a hole 10 in its peripheral wall, and a pressure measuring unit 2 having a tubular body 20 mounted transversely in the housing 1. The tubular body 20 has a top open end 201, a bottom threaded open end 202, and two mounting flanges 205 secured to a mounting plate 14 of the tubular housing 1. A chuck 28 is attached to the top open end 201, and an adjustment screw cap 203 is threadedly inserted into said threaded open end 202. The bottom side of the adjustment screw cap 203 is provided with a diametrical groove (not shown) adapted to engage with a tool bit such as the bit of a screw driver which will turn the screw cap 203.

A connecting plate 21 is fixed to the peripheral wall of the tubular body 20. A mounting plate 22 is connected to the connecting plate 21 by means of an angled flange 224 thereof having engaging holes 221, 222 which engage with studs 211, 212 of the connecting plate 21. A journal hole 220 and an overlapping larger hole 223 are provided in the plate 22.

A graduated plate 30 abuts with the mounting plate 22 and has a journal hole 33 aligned with the journal hole 220. A gear 251 is provided between the tubular body 20 and the plate 22 with the two ends of its shaft 252 respectively inserted into a hole 204 of the tubular body 20 and the aligned holes 220 and 33. A pointer 31 is attached to the shaft 252 of the gear adjacent to the graduated plate 30 and a transparent cover 32 is attached to the end of the housing 1. The larger hole 223 of the plate 22 serves to facilitate the assembly of the gear 251 since the gear 251 can be easily placed into between the tubular body 20 and the plate 22 when the gear 251 is allowed to pass through the hole 223 before the end of the shaft 252 is inserted into the hole 220 of the plate 22.

A piston 26 incorporating a sealing member 267 is disposed in the tubular body 20 in sliding and sealing contact with the inner side of the peripheral wall of the tubular body 20. An auxiliary piston member 27 is provided adjacent to the piston 26 so as to guide the movement of the piston 26 which may be moved to an improper position that in turn will produce errors in measurement. The auxiliary piston member 27 is a thick molded plastic member having a peripheral surface in sliding and sealing contact with the inner surface of the peripheral wall of the tubular body 20 and a recessed face 271 opposite to the air intake port of the chuck 28.

A piston rod 231 is connected to the piston 26 and axially extends outward from the tubular body 20. The outer end of the piston rod 231 is provided with adjustment screw thread 2311 and a diametrical cross groove 2312 to be engaged with the bit of a screw driver. An L-shaped rod member 232 extends axially between the tubular body 20 and the mounting plate 22 and is provided with rack teeth 2322 at one of its ends. Another end of the L-shaped rod member 232 has an angled portion which is provided with a lobe 2324 having a screw hole 2321 to receive and engage with the outer end of the piston 231. A spring 24 is provided around the piston rod 231 between the piston 26 and the screw cap member 203.

An access hole 11 is further provided in the peripheral wall of the housing 1 adjacent the outer end of the piston rod 231 and a plug member 12 is used to close the access hole 11. The access hole 11 is provided for the purpose of conveniently turning, from the outside of the housing 1, the threaded outer end of the piston 231 relative to the angled portion of the L-shaped rod 232 so as to adjust the force of the spring 24 in case of fatigue of the spring 24, i.e. to adjust the pointer 31 to align with "zero" of the graduation marks of the graduated plate 30 in the absence of testing pressure.

The piston rod 231 can also be adjusted by removing the housing 1 from the tubular body 20 as shown in FIG. 5. On the other hand, the adjustment of the pressure gauge of the present invention can also be made by turning the adjustment screw cap 203.

With the invention thus explained, it is apparent that various modifications and variations can be made without departing from the scope of the invention. It is therefore intended that the invention be limited only as indicated in the appended claims.

I claim:

1. A pressure gauge comprising:
    a housing having a peripheral wall with a first end and an opposite second end,
    a graduated plate provided transversely in said peripheral wall at said first end;
    a rotary pointer provided adjacent said graduated plate;
    a tubular body which confines a pressure chamber provided transversely in said housing between said graduated plate and said second end and having a third end and an opposite fourth end;
    a chuck with an air intake port attached to said third end and extending outwardly through said peripheral wall;
    a first piston provided in said tubular body in sliding and sealing contact with said peripheral wall;
    a spring provided between said first piston and said fourth end and urging said first piston towards said third end;
    a piston rod connected to said first piston and extending outwardly of said tubular body through said fourth end, said piston rod having a threaded adjustment outer end;
    an L-shaped rod member extending between said tubular body and said graduated plate, said L-shaped rod member having a toothed end adjacent said graduated plate and an angled portion which has a threaded adjustment hole engaging with said threaded adjustment outer end of said piston rod; and
    a transmitting gear engaging with said tooth end and connected to said pointer.

2. A pressure gauge as claimed in claim 1, wherein said peripheral wall has an access hole adjacent to said threaded adjustment outer end of said piston rod and a plug member to close said access hole.

3. A pressure gauge as claimed in claim 1, wherein said fourth end of said tubular body is a threaded open end and has an adjustment screw member inserted in said threaded open end.

4. A pressure gauge as claimed in claim 1, further comprising a second piston member which is provided adjacent said first piston and which is a thick molded plastic member having a peripheral wall in sliding and sealing contact with said peripheral wall of said tubular body and a recessed face facing said chuck member.

5. A pressure gauge as claimed in claim 1, further comprising a mounting plate abutting said graduated plate and spaced from said tubular body, said mounting plate confining with said peripheral wall of said tubular body a space which receives said L-shaped rod member, and a connecting plate having one end tangent and connected to said tubular body and another end connected to said mounting plate, said transmitting gear having a shaft which is mounted to said peripheral wall of said tubular body and said mounting plate.

* * * * *